(12) United States Patent
Rawlinson et al.

(10) Patent No.: US 9,442,688 B2
(45) Date of Patent: Sep. 13, 2016

(54) SYNCHRONIZED DISPLAY SYSTEM

(71) Applicant: Atieva, Inc., Redwood City, CA (US)

(72) Inventors: Peter Dore Rawlinson, Worcestershire (GB); Eric Obers, Rutesheim (DE)

(73) Assignee: ATIEVA, INC., Menlo Park, CA (US)

( * ) Notice: Subject to any disclaimer, the term of this patent is extended or adjusted under 35 U.S.C. 154(b) by 237 days.

(21) Appl. No.: 14/082,241

(22) Filed: Nov. 18, 2013

(65) Prior Publication Data
US 2015/0138043 A1 May 21, 2015

(51) Int. Cl.
*B60R 11/02* (2006.01)
*G06F 3/14* (2006.01)
*B60N 2/22* (2006.01)
*B60R 11/00* (2006.01)

(52) U.S. Cl.
CPC ............ *G06F 3/1454* (2013.01); *B60N 2/22* (2013.01); *B60R 11/0235* (2013.01); *B60R 2011/0028* (2013.01); *B60R 2011/0092* (2013.01)

(58) Field of Classification Search
CPC ............. G06F 3/1454; B60R 11/0235; B60R 2011/0028; B60R 2011/0092; B60N 2/22
See application file for complete search history.

(56) References Cited

U.S. PATENT DOCUMENTS

| | | | |
|---|---|---|---|
| 5,507,556 A | 4/1996 | Dixon | |
| 5,670,853 A * | 9/1997 | Bauer | B60N 2/002 |
| | | | 180/273 |
| 6,931,596 B2 * | 8/2005 | Gutta | G06F 3/011 |
| | | | 345/649 |
| 2002/0003571 A1* | 1/2002 | Schofield | B60C 23/00 |
| | | | 348/148 |
| 2005/0140191 A1* | 6/2005 | Curran | B60K 35/00 |
| | | | 297/217.3 |
| 2005/0222719 A1 | 10/2005 | Fukuro | |
| 2006/0061008 A1* | 3/2006 | Karner | B29C 45/0017 |
| | | | 264/250 |
| 2006/0212197 A1* | 9/2006 | Butler | B60R 11/0235 |
| | | | 701/36 |
| 2006/0262189 A1* | 11/2006 | Boundy | B60R 11/0235 |
| | | | 348/148 |
| 2009/0085383 A1* | 4/2009 | Hicks | B60K 35/00 |
| | | | 297/217.3 |
| 2010/0045088 A1 | 2/2010 | Kunou | |
| 2010/0087951 A1 | 4/2010 | Mimura | |
| 2011/0227717 A1* | 9/2011 | Kumon | G02B 27/01 |
| | | | 340/441 |
| 2012/0095643 A1* | 4/2012 | Bose | B60K 37/00 |
| | | | 701/32.8 |

FOREIGN PATENT DOCUMENTS

| | | |
|---|---|---|
| JP | 2002-234399 | 8/2002 |
| JP | 2004216925 | 8/2004 |
| JP | 2007-168494 | 7/2007 |
| JP | 2008-279155 | 11/2008 |
| JP | 2010-125945 | 6/2010 |
| JP | 201025945 | * 6/2010 |
| JP | 2010-143318 | 7/2010 |

\* cited by examiner

*Primary Examiner* — Thai Tran
*Assistant Examiner* — Christopher T Braniff
(74) *Attorney, Agent, or Firm* — Patent Law Office of David G. Beck

(57) ABSTRACT

A system and method of use is provided that monitors the position of a vehicle seat and automatically adjusts the location of a vehicle display based on the current seat position, thereby helping to alleviate the eye strain, fatigue, neck and back pain that often accompany the improper use of a monitor for an extended period of time.

18 Claims, 12 Drawing Sheets

SYNCHRONIZED DISPLAY SYSTEM

FIELD OF THE INVENTION

The present invention relates generally to display systems and, more particularly, to a synchronized display system.

BACKGROUND OF THE INVENTION

The use of a laptop computer no longer requires that the user compromise on processor speed, display size, display resolution or memory. Additionally, given the battery life available in many such computers, the user is no longer required to limit their use to small working sessions. As a result, laptops have become a viable alternative for many professionals, offering the end user both the performance that they have come to expect from a desktop computer as well as the portability and convenience associated with a laptop. Unfortunately while the performance of laptop computers have improved dramatically over the last decade, their usefulness is still limited due to the setting in which they are often used. For example, on an airplane if the user does not wish to rest their computer on their lap, then they must sit their laptop on the tray table that is either linked to the back of the seat in front of their own, or linked to the arm-rest of their own chair. In a car the user's options are even more limited, in general requiring that the user either rest their computer directly on their lap or on a lap tray. Unfortunately, none of these approaches provide the user with a reasonable ergonomic solution, either in terms of display or keyboard position. Accordingly, what is needed is a system that allows a person to comfortably and ergonomically work while riding in a vehicle. The present invention provides such a system.

SUMMARY OF THE INVENTION

The present invention provides a display positioning system and method of use. In one aspect, the positioning system includes (i) a display mounted within and to a vehicle, where the display may be adjusted within a range of display positions, (ii) a display positioning system coupled to the display, (iii) a vehicle seat adjustable within a range of positions, (iv) a vehicle seat sensor that outputs seat position data corresponding to the seat's current position, and (v) a control system coupled to the display positioning system and to the vehicle's seat sensors, where the control system monitors the seat sensors to determine the current seat position and adjusts the display's position in response to the current seat position. The control system may use a look-up table stored in memory to select the appropriate display position that corresponds to the current seat position, where the look-up table includes a plurality of compatible display positions that correspond to the available range of seat positions, and where each of the compatible display positions may be set to maintain (i) display viewing distance, (ii) display viewing height, and/or (iii) display viewing angle within a preset range. The display positioning system may utilize an electro-mechanical positioning system or a hydraulic positioning system. The linkage assembly that mounts the display to the vehicle and which is used by the positioning system and the controller to adjust the display's position in response to the seat being repositioned may (i) utilize a link that slides within a track mounted to the vehicle, (ii) utilize a telescoping link, and/or (iii) utilize a multi-link assembly that includes a first link pivotally coupled to the display and to a second link, and a second link pivotably coupled to the first link and the vehicle. The system may also include a user interface, where the control system is configured to accept a set of display settings (e.g., display viewing distance, display viewing height, display viewing angle, etc.) via the user interface and then adjust the range of compatible display positions to maintain the display settings when the display is adjusted in response to a change in the seat position.

In another aspect, a method of positioning a display within a vehicle is provided, the method including the steps of (i) determining a current seat position from a range of available seat positions for a vehicle seat, (ii) providing the current seat position to a control system, (iii) automatically selecting a display position from a plurality of compatible display positions based on the current seat position, and (iv) moving the display to the display position selected by the control system, for example by manipulating a linkage assembly coupling the display to the vehicle, where the step of moving the display is performed automatically by a display positioning system controlled by the control system. The method may include the step of moving the display from a storage position to a display position when (i) the display is activated, and/or (ii) a video source coupled to the display is activated. The method may include the step of moving the display from a display position to a storage position when (i) the display is deactivated, (ii) a video source coupled to the display is deactivated, (iii) the vehicle is turned off, and/or (iv) the vehicle is placed into park. The method may include the step of presetting the plurality of compatible display positions to maintain (i) display viewing distance, (ii) display viewing height, and/or (iii) display viewing angle within a preset range when the display is moved in response to a repositioning of the vehicle's seat. The method may include the steps of accepting a set of display settings (e.g., display viewing distance, height, angle, etc.) for a particular seat position and then adjusting the plurality of compatible display positions to maintain the set of display settings throughout the range of available seat positions.

A further understanding of the nature and advantages of the present invention may be realized by reference to the remaining portions of the specification and the drawings.

DESCRIPTION OF THE SPECIFIC EMBODIMENTS

The present invention provides a system that monitors user position, more specifically the position of the user's seat, and automatically controls and adjusts the position of the system's display screen relative to the user, thereby helping to alleviate the eye strain, fatigue, neck and back pain that often accompany the improper use of a monitor for an extended period of time. While the primary application is an automobile, the inventors envision that the invention may be integrated equally well into an airplane, train, bus or other vehicle.

Figure 1:
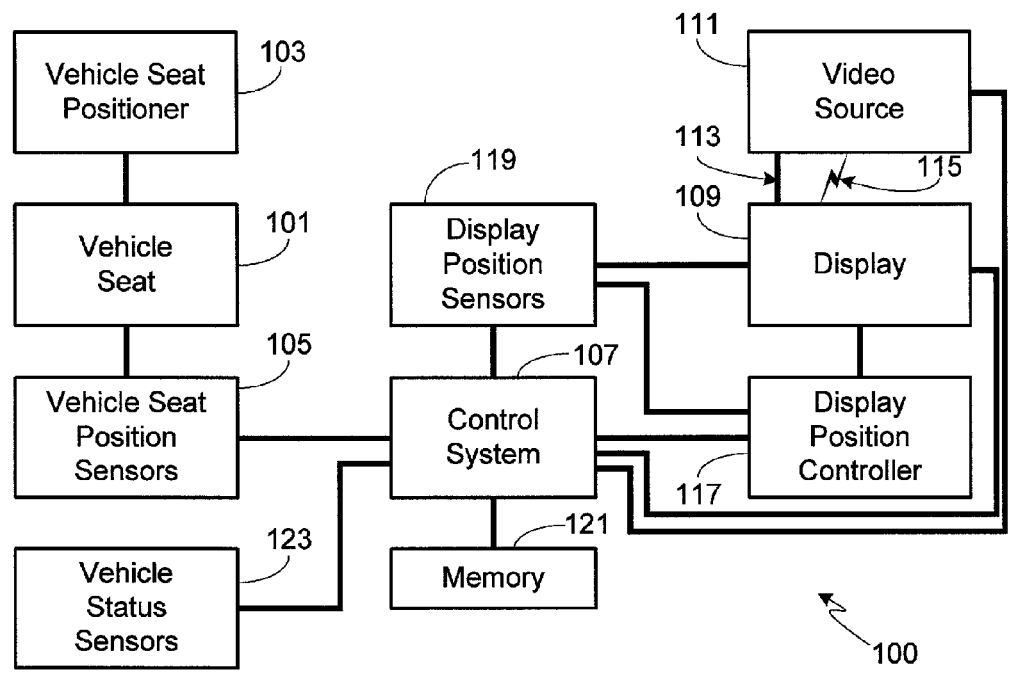
FIG. 1 provides a block diagram of the primary subsystems associated with the invention.

FIG. 1 illustrates the primary components associated with synchronized display system 100. The system includes a seat 101 that is capable of being located in any of a variety of positions through the use of mechanical or electro-mechanical means 103. The position of the seat, and therefore the user within the seat, is monitored using one or more position sensors 105. Seat position information as determined by sensors 105 is provided to control system 107, also referred to herein simply as a controller. Control system 107, which includes a control processor, may be a dedicated control system or integrated into another vehicle control system, for example a vehicle management system.

System 100 also includes a flat panel display 109 that can utilize any of a variety of display technologies (e.g., light-emitting diode (LED), plasma, organic light-emitting diode (OLED), liquid crystal (LCD), thin film transistor LCD (TFT-LCD), field emission display (FED) or other technology). Display 109 may be intended solely for display purposes, i.e., a monitor, or display 109 may be a touch-screen that allows direct user interaction, for example by incorporating capacitive touch technology into the display. Display 109 is coupled to a video source 111 (e.g., a computer, DVD player, etc.). Video source 111 may be hard-wired to the display via cabling 113, or coupled via a wireless system 115 using any of a variety of wireless communication protocols (e.g., IEEE 802.11, long term evolution (LTE), Wi-Fi, Bluetooth, WiGig, WirelessHD, etc.).

Coupled to display 109 is a display position controller 117 that may utilize an electro-mechanical (e.g., motorized) positioner, a hydraulic positioner or other positioning system to adjust and control the viewing position of display 109. As described in detail below, display positioning system 117 is used by the system controller 107 to vary the position of display 109 in response to movement of vehicle seat 101. Sensors 119 are used to insure proper placement of display 109 and as such, may either directly monitor display position or may determine display position by monitoring display positioning system 117. In a preferred embodiment, sensors 119 and positioning system 117 are combined into a single system.

In at least one embodiment of the invention, control system 107 monitors the status of display 109 and/or video source 111. By monitoring the status of the display and/or video source, controller 107 can be configured to automatically deploy display 109 from a storage position when the system is activated, and then return display 109 to its storage position when it is no longer required, i.e., when the display and/or video source is deactivated. Similarly, control system 107 may be coupled to one or more vehicle status sensors 123 that monitor whether or not the vehicle is operating (i.e., turned on) and/or whether or not the vehicle is currently in 'drive' or in 'park'. The system can be configured to utilize this vehicle information to determine when to deploy or store display 109, for example deploying display 109 when the car is turned on or placed into drive and then storing display 109 when the car is turned off or placed into park.

In the preferred embodiment, a memory 121 is coupled to system controller 107. Memory 121 may be a stand-alone memory or integrated into controller 107. Memory 121 may be comprised of flash memory, a solid state disk drive, a hard disk drive, or any other memory type or combination of memory types. Stored within memory 121 is a set of control instructions which, in at least one embodiment, includes a look-up table that provides a particular display location, referred to herein as a compatible display position, for each position of vehicle seat 101 within a range of seat positions. As described in further detail below, preferably each preset display position stored in memory maintains at least one of (i) display viewing distance, (ii) display viewing height and/or (iii) display viewing angle within a preset range as the vehicle seat position is changed. Accordingly, when adjusting the display in response to a change in seat position, preferably controller 107 uses the look-up table to determine the compatible display position for the current seat position.

Figure 2:
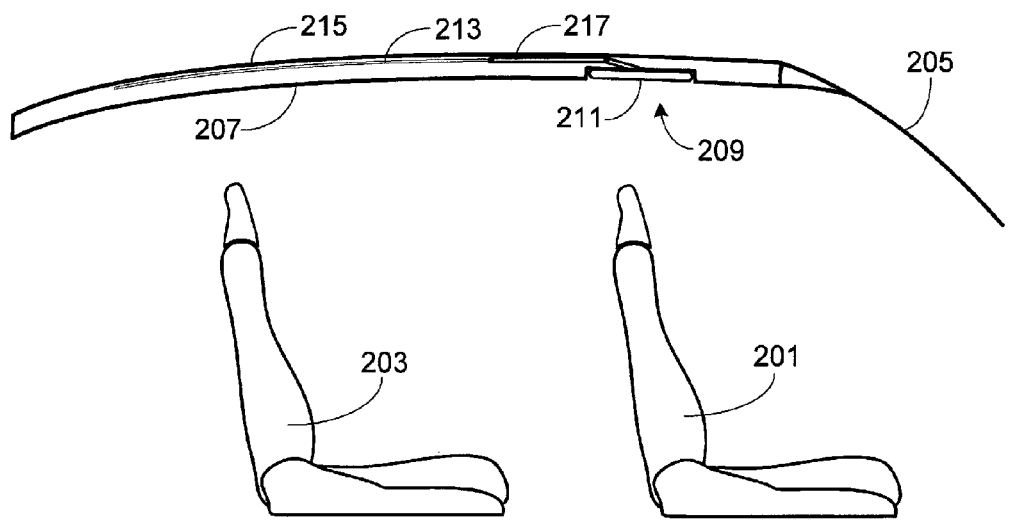
FIG. 2 provides a side view of an embodiment of the invention with the display stored.

FIGS. 2-5 illustrate a preferred embodiment of the invention. FIG. 2 provides a side view of the primary vehicle components involved in a system utilizing the synchronized display of the invention. Visible in this figure is a front seat 201, a rear seat 203, the front windshield 205 and the vehicle's roof headliner 207. Stored within a recess 209 of the headliner is a display 211, although it should be understood that display 211 may be stored in other locations such as adjacent to the headliner but not within the headliner, adjacent to the sunroof, adjacent to the sunroof and within the sunroof pocket, in the rear deck, or elsewhere. In this embodiment display 211 is linked to a guide track 213 via linkage 217, track 213 preferably hidden from sight by locating it between the headliner 207 and the roof 215. Display linkage 217 preferably passes through a slot or slots in headliner 207.

Figure 3:
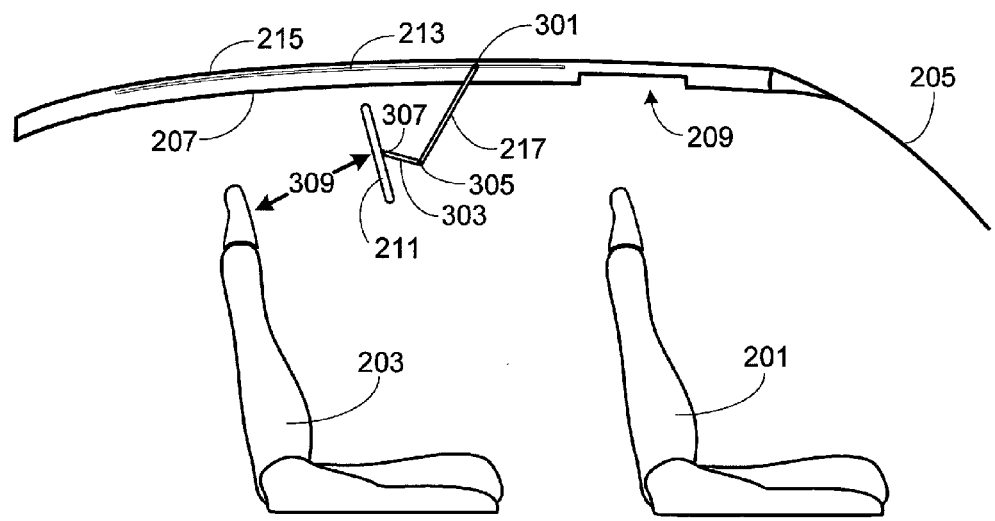
FIG. 3 provides a side view of the synchronized display shown in FIG. 2 with the display positioned for use with a generally upright seat.
Figure 4:
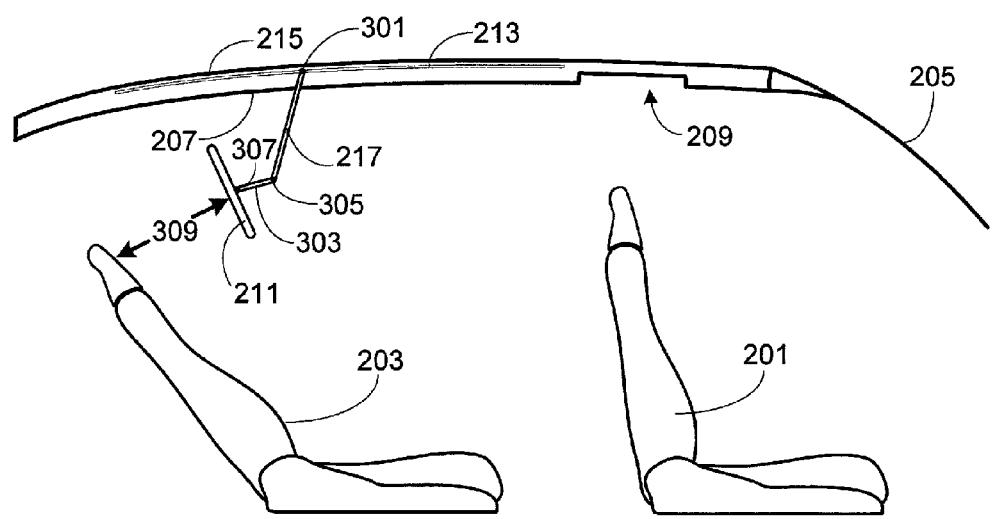
FIG. 4 provides a side view of the synchronized display shown in FIGS. 2 and 3 with the display re-positioned for use with a partially reclining seat.
Figure 5:
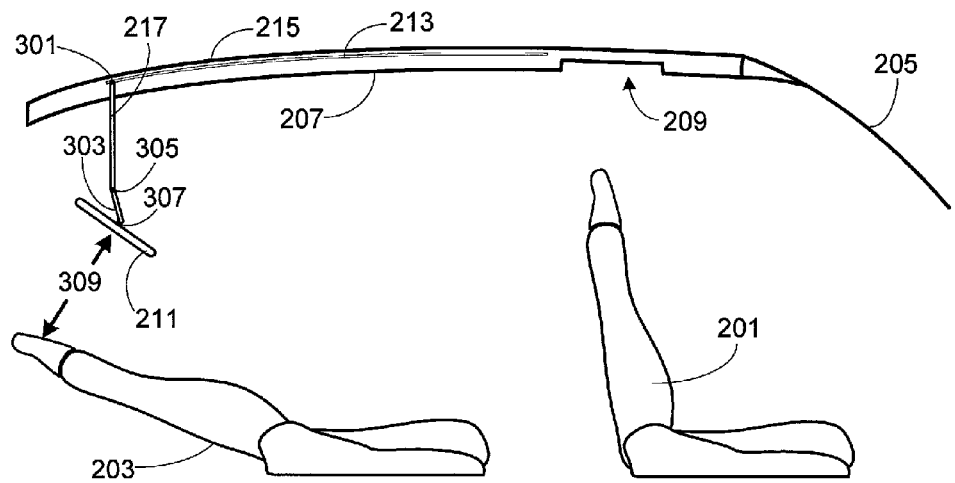
FIG. 5 provides a side view of the synchronized display shown in FIGS. 2-4 with the display re-positioned for use with a fully reclining seat.

When the display system is activated, control system 107 and display position controller 117 move display 211 into a display position compatible to the current position of viewing seat 203. If seat 203 is in a typical upright position as shown in FIG. 3, display 211 is automatically moved into position by rotating link 217 about axis 301, moving link 217 within track 213, rotating link 303 about axis 305, and rotating display 211 about axis 307, thereby placing display 211 at the right distance 309 from seat 203 and the person sitting within the seat. If the user alters the position of seat 203, for example by reclining as shown in FIG. 4, control system 107 monitors the movement of the seat using sensors 105. Based on the new location of seat 105, control system 107 automatically moves display 211 into position by once again rotating link 217 about axis 301, moving link 217 within track 213, rotating link 303 about axis 305, and rotating display 211 about axis 307. Since control system 107 continually monitors for seat movement/position, if the user once again alters the position of seat 203, for example moving seat 203 into a full recline as shown in FIG. 5, then control system will again move display 211 into position, thereby maintaining the distance 309 between the display panel 211 and the seat 203.

As noted above, control system 107 monitors seat position and automatically repositions display 211 in order to maintain the desired relationship between the display and the seat's occupant, thereby reducing eye strain, fatigue, neck and back pain. In a preferred configuration control system 107 does not initiate display movement until after seat movement has stopped, resulting in fluid movement of the display relative to the vehicle's occupants. Alternately, the system can be configured to allow control system 107 to initiate display movement as soon as seat movement is detected.

In a preferred embodiment of the invention, control system 107 returns display 211 to recess 209 (or to a different designated storage area) when the vehicle is turned off. The system can also be set-up to return the display to its storage area (e.g., recess 209) when the car is placed in park. Preferably the user is able to over-ride the system so that display 211 can be left in the optimum viewing position for the occupant of seat 203 even if the car is turned off or placed in park, thus allowing the occupant to continue to utilize the display system. In at least one embodiment, rather than having the system automatically return the display to its storage area, the user must command the system to return to storage, for example by de-activating the display system.

Figure 6:
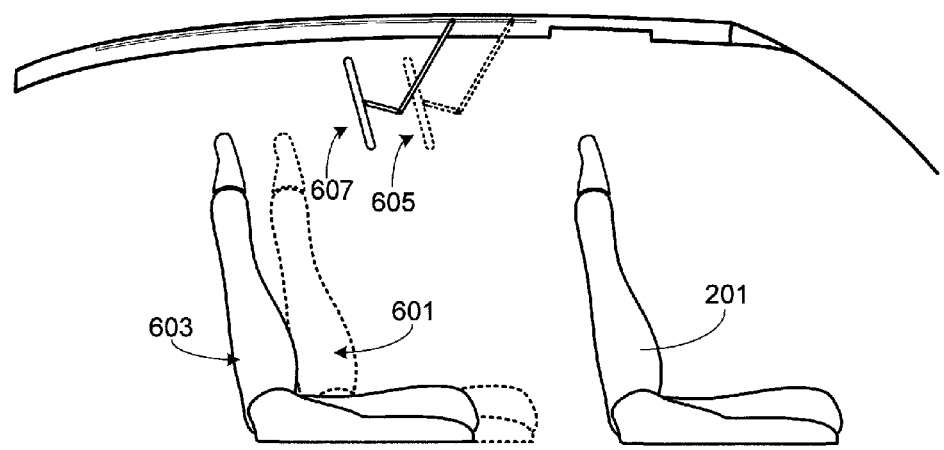
FIG. 6 provides a side view of the synchronized display shown in FIGS. 2-5 that illustrates re-positioning the display as the seat is moved backwards.
Figure 7:
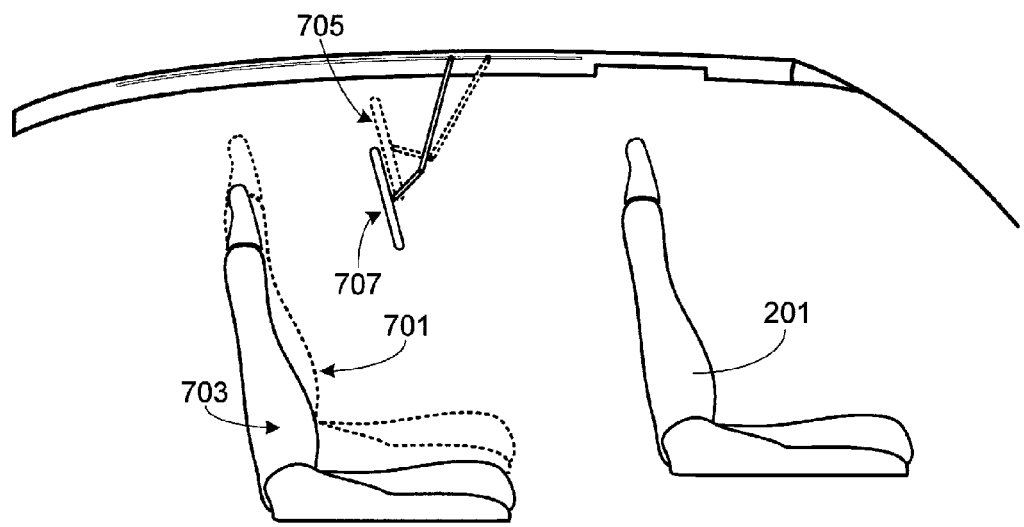
FIG. 7 provides a side view of the synchronized display shown in FIGS. 2-6 that illustrates re-positioning the display as the seat is lowered.

In the previous example, the position of display 211 is automatically altered in response to the user adjusting the degree of seat recline. It should be understood that the invention may also be used to compensate for other seat movement. For example, FIG. 6 illustrates that as seat 203 is moved backward from a first position 601, shown in phantom, to a second, final position 603, display 211 moves from a first position 605, shown in phantom, to a second, final position 607, thereby retaining the desired spacing between the display and the user. Similarly, FIG. 7 illustrates that as seat 203 is moved downward from a first position 701, shown in phantom, to a second, final position 703, display 211 moves from a first position 705, shown in phantom, to a second, final position 707.

Figure 8:
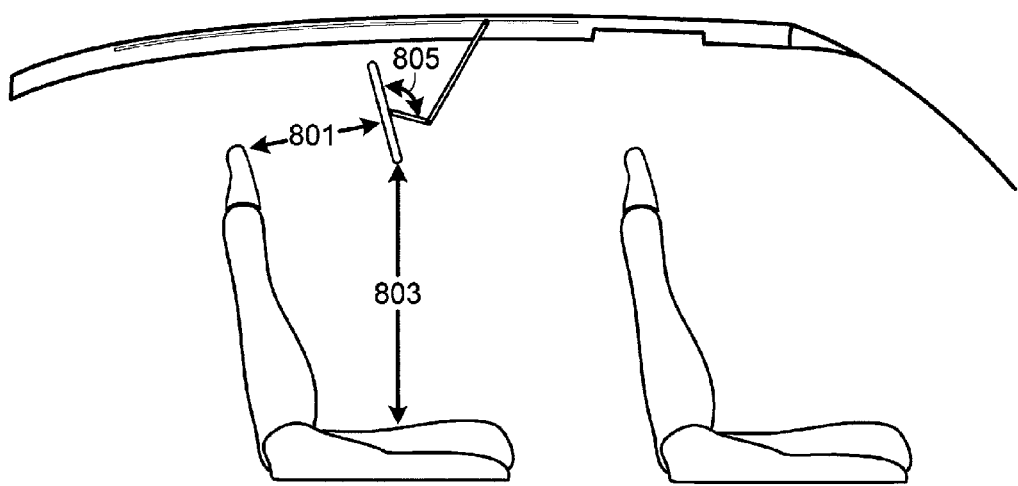
FIG. 8 illustrates the display characteristics of viewing distance, height and angle.
Figure 9:
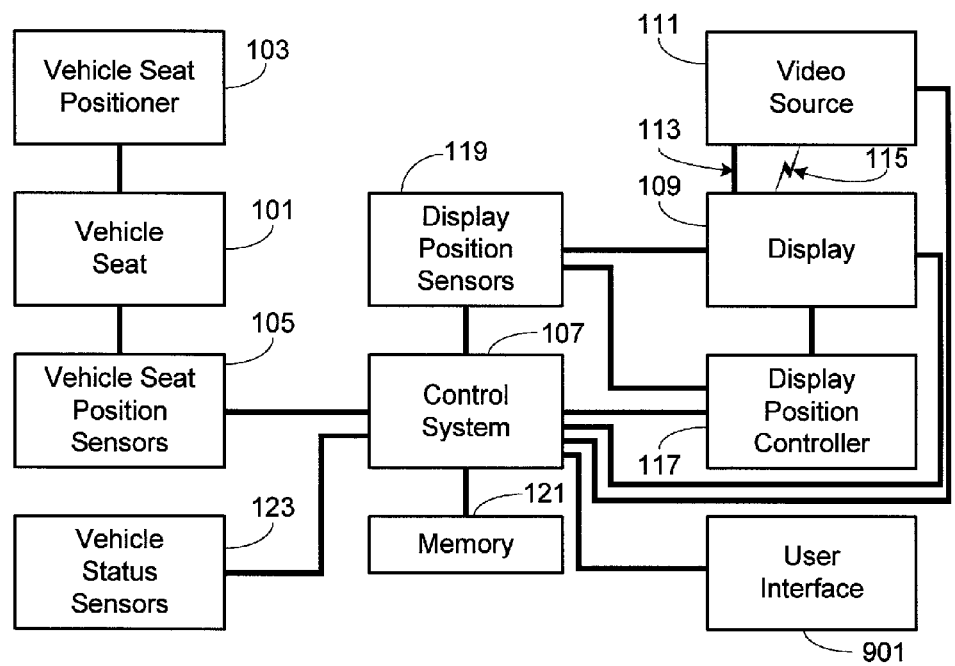
FIG. 9 illustrates a modified block diagram based on FIG. 1 in which a user interface is added that allows the user to input viewing preferences.
Figure 10:
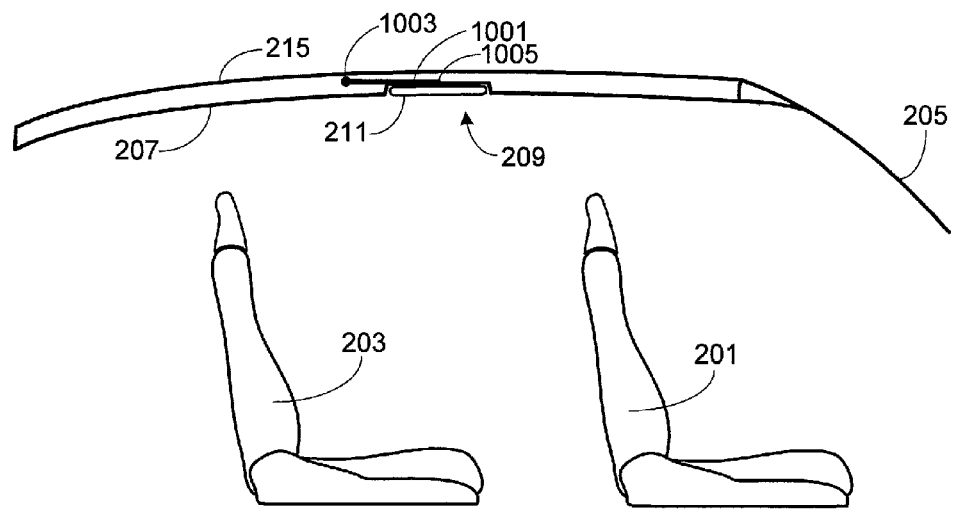
FIG. 10 provides a side view of an alternate embodiment of the invention with the display stored.
Figure 11:
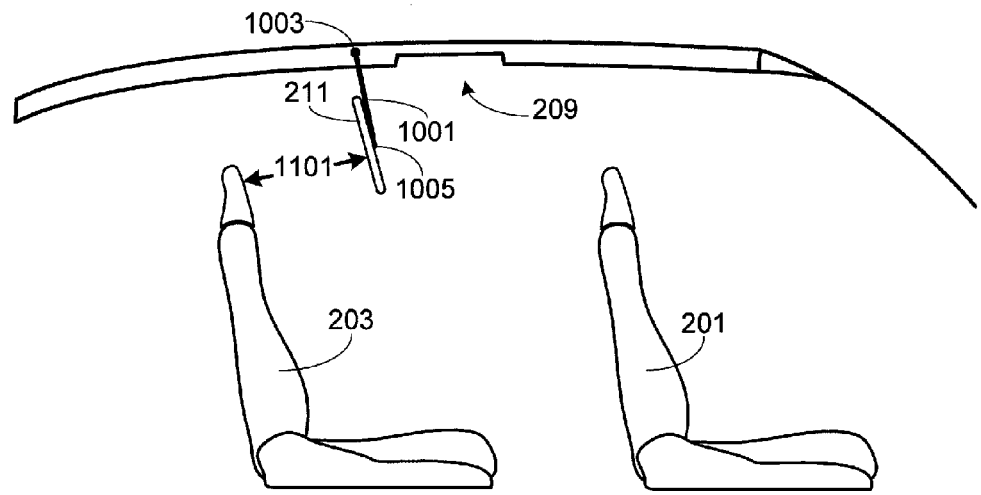
FIG. 11 provides a side view of the synchronized display shown in FIG. 10 with the display positioned for use with a generally upright seat.
Figure 12:
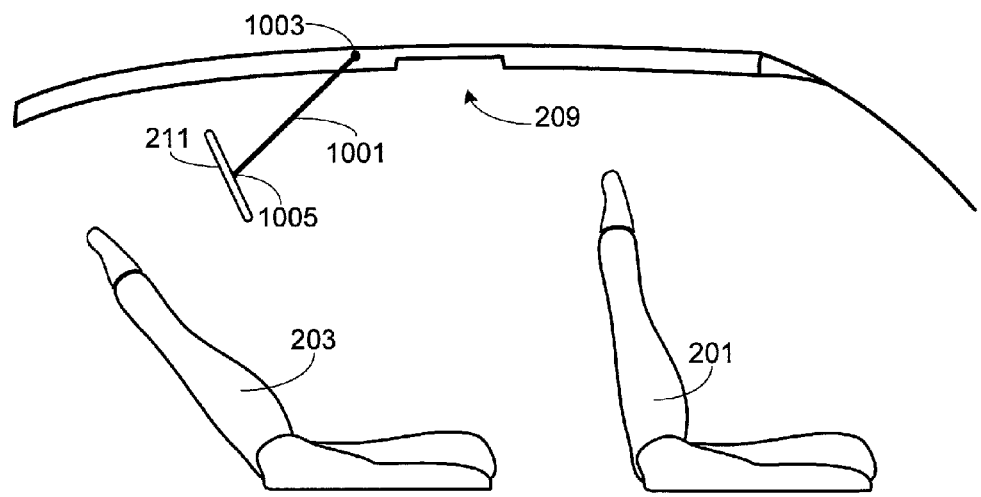
FIG. 12 provides a side view of the synchronized display shown in FIGS. 10 and 11 with the display re-positioned for use with a partially reclining seat.
Figure 13:
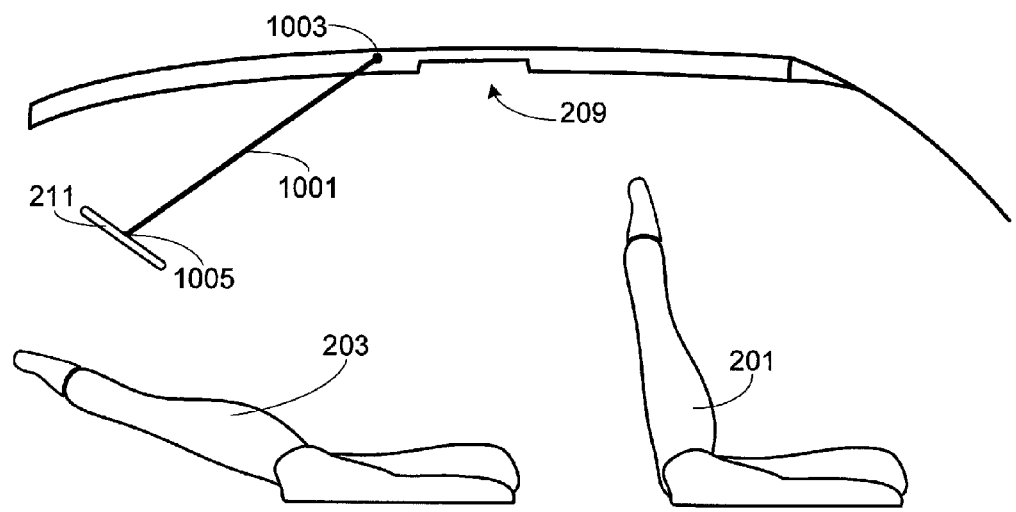
FIG. 13 provides a side view of the synchronized display shown in FIGS. 10-12 with the display re-positioned for use with a fully reclining seat.
Figure 14:
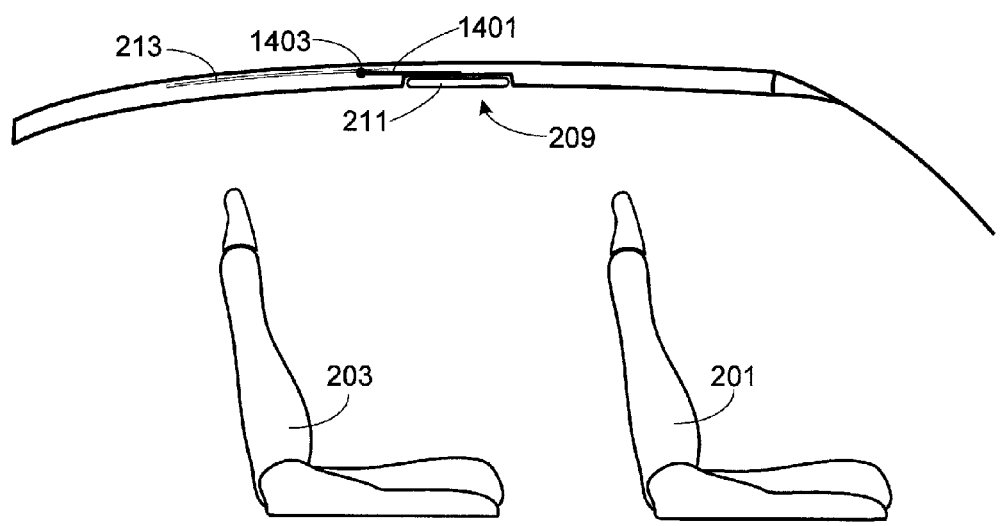
FIG. 14 provides a side view of an alternate embodiment of the invention with the display stored.
Figure 15:
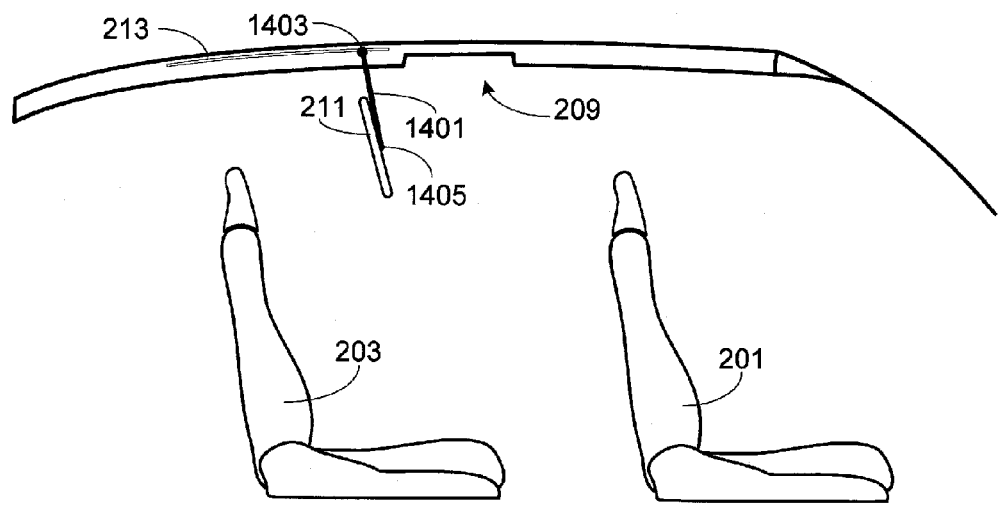
FIG. 15 provides a side view of the synchronized display shown in FIG. 14 with the display positioned for use with a generally upright seat.
Figure 16:
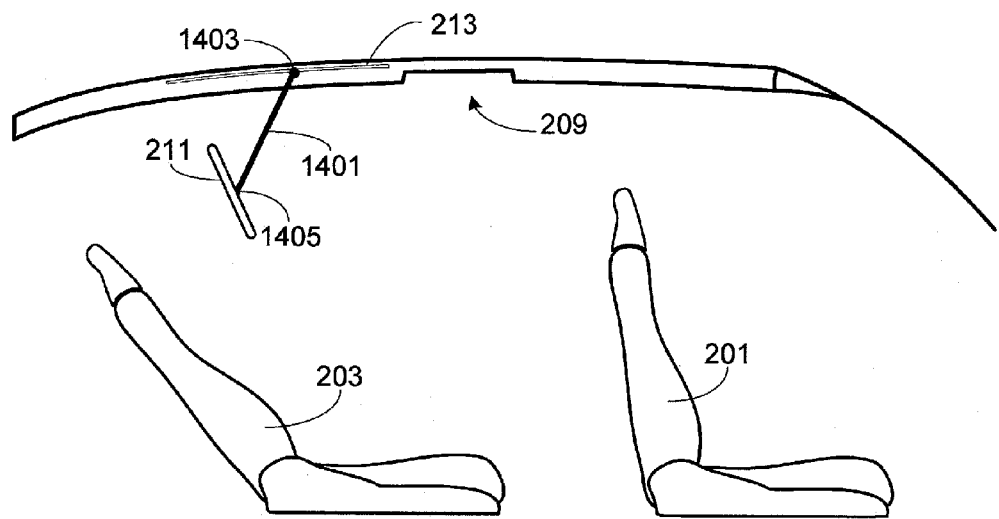
FIG. 16 provides a side view of the synchronized display shown in FIGS. 14 and 15 with the display re-positioned for use with a partially reclining seat.
Figure 17:
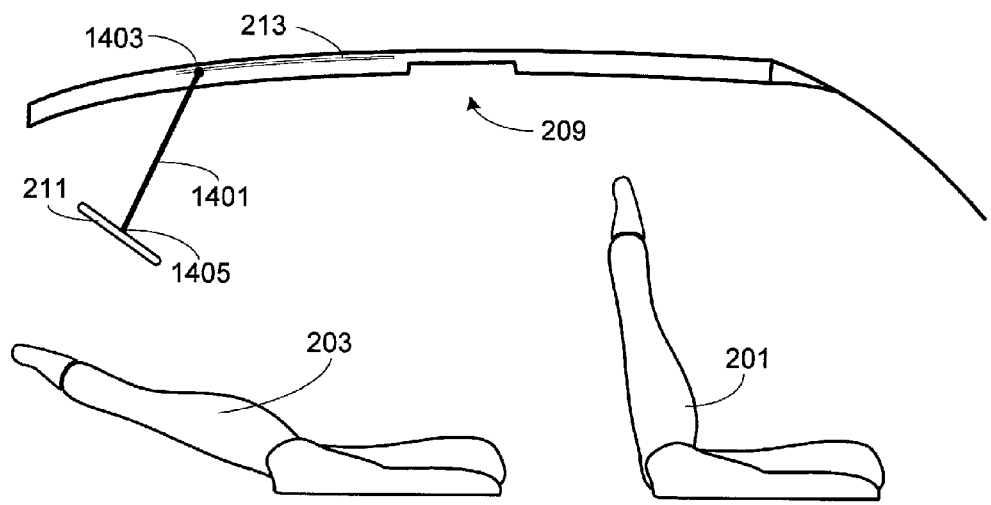
FIG. 17 provides a side view of the synchronized display shown in FIGS. 14-16 with the display re-positioned for use with a fully reclining seat.

While in the above examples viewing distance was kept constant, or at least kept within a preset viewing distance range, it should be understood that the invention may be used to insure that other display characteristics are kept constant, or within an acceptable range, during seat motion. For example and as shown in FIG. 8, in addition to a preset viewing distance 801, the display viewing height 803 and display viewing angle 805 may also be preset. As such, whenever the seat position is changed, control system 107 maintains these settings within an acceptable range for the new seat position. Viewing distance 801, viewing height 803 and viewing angle 805 may be preset by the manufacturer or by a third party (e.g., a service technician). Alternately, in at least one embodiment of the invention the end user may input one or more of these viewing preferences into the system, thus allowing the user to personalize the system to insure that the viewing criteria properly take into account the user's physical size, viewing preferences and/or visual acuity. In one embodiment, these viewing preferences are input by the user upon system initialization by manually adjusting display 211 to the desired distance, height and angle. After this initial set-up, control system 107 adjusts the position of display 211 to maintain these preferences each time the seat is moved. In an alternate configuration, the user inputs their viewing preferences using a user interface 901 (see FIG. 9) that is coupled to control system 107. User interface 901 may be a stand-alone interface, or integrated into the vehicle's user interface.

It should be understood that the multi-link display positioning system shown in FIGS. 2-8 is just one possible configuration and that other positioning systems may also be used by the invention. For example, FIGS. 10-13 provide the same views as FIGS. 2-5 but illustrate an alternate positioning system that utilizes a telescoping link 1001 in order to maintain viewing distance 1101, or other display criteria, as the position of seat 203 is varied by the user. To achieve the desired range of display motion, link 1001 is controllably pivoted about pivot axes 1003 and 1005. FIGS. 14-17 illustrate yet another positioning system, this embodiment utilizing a telescoping link 1401 that controllably pivots about axes 1403 and 1405. Unlike the previous embodiment, however, link 1401 has limited range in order to achieve a greater degree of link stability. To overcome the length limitations of link 1401, position controller 117 is able to move link 1401 within guide track 213.

It will be appreciated that while the embodiments of the display system shown in FIGS. 2-8 and 10-17 are illustrated with a car's rear passenger seat, the display system of the invention is equally applicable to other vehicle seats (e.g., front passenger seat) as well as other types of vehicles (e.g., trains, buses, airplanes, etc.). Additionally, even though in the exemplary embodiments only a single link is visibly coupled to display 211, it should be understood that one or more links may be coupled to the display, and that the linkage assembly may be coupled to the center of the display, to one or both sides of the display, or to multiple locations on the display. To further clarify the invention, FIGS. 18-22 illustrate some exemplary coupling techniques that may be used to couple the linkage assembly to display 211 and to guide track 213. Note that the exemplary coupling techniques shown in these figures may also be used with a multi-link, multi-pivoting assembly as shown in FIGS. 2-8 or with a telescoping link(s) as shown in FIGS. 10-17.

Figure 18:
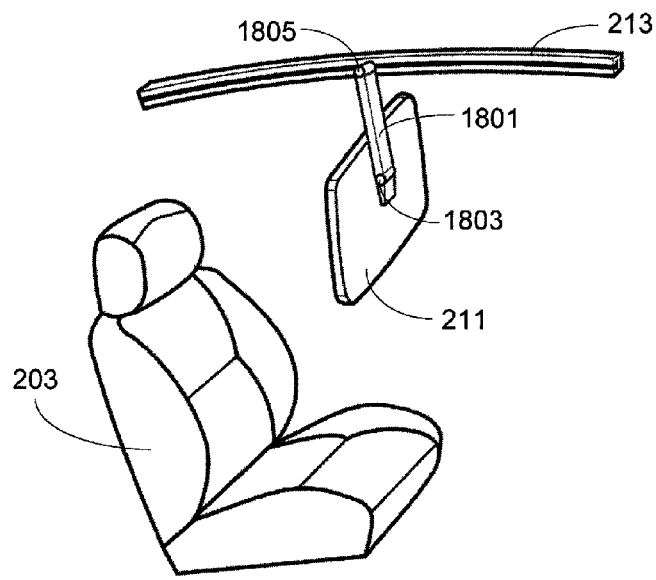
FIG. 18 provides a perspective view of a synchronized display attached to a single guide track via a single, centrally located linkage arm.

In the embodiment shown in FIG. 18, display 211 is attached to guide track 213 via a single, centrally located arm 1801. Display 211 pivots relative to arm 1801 about hinge 1803, while arm 1801 pivots relative to guide track 213 about hinge 1805.

Figure 19:
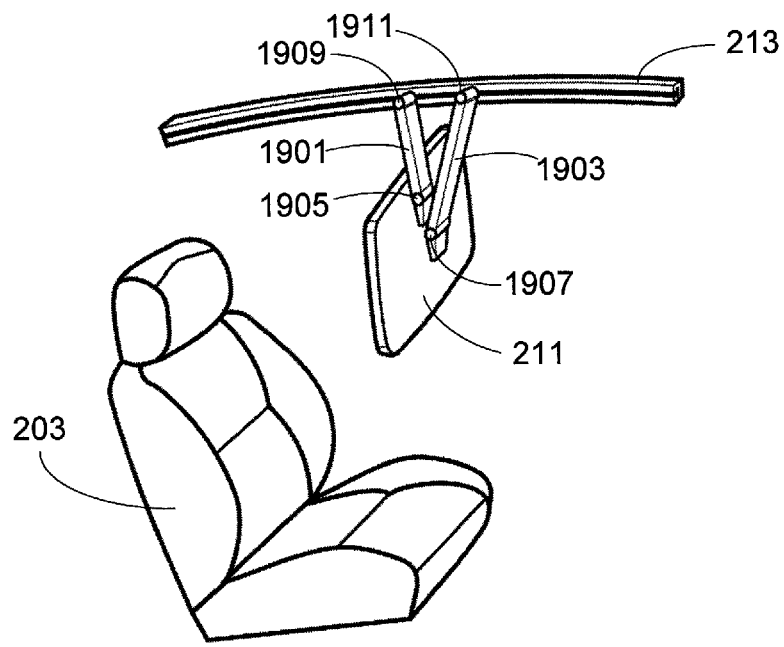
FIG. 19 provides a perspective view of a synchronized display attached to a single guide track via a pair of centrally located linkage arms.

In the embodiment shown in FIG. 19, display 211 is attached to guide track 213 via a pair of centrally located arms 1901 and 1903. Display 211 pivots relative to arm 1901 about hinge 1905 and relative to arm 1903 about hinge 1907. Arm 1901 pivots relative to guide track 213 about hinge 1909 while arm 1903 pivots relative to guide track 213 about hinge 1911.

Figure 20:
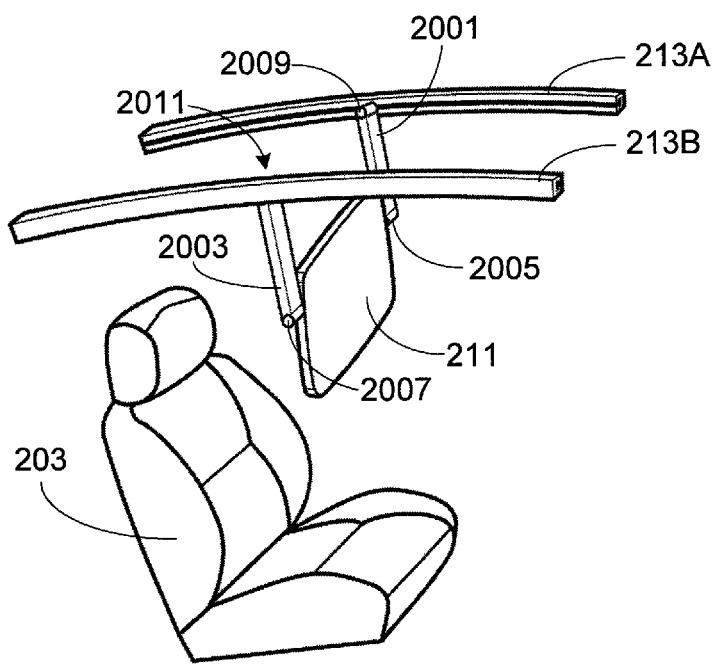
FIG. 20 provides a perspective view of a synchronized display attached to a pair of guide tracks via a pair of side mounted linkage arms.

In the embodiment shown in FIG. 20, display 211 is attached to a pair of guide tracks 213A/213B via a pair of side mounted arms 2001 and 2003. Display 211 pivots relative to arm 2001 about hinge 2005 and relative to arm 2003 about hinge 2007. Arm 2001 pivots relative to guide track 213A about hinge 2009. The hinge coupling at location 2011, not visible in this view, allows arm 2003 to pivot relative to guide track 213B.

Figure 21:
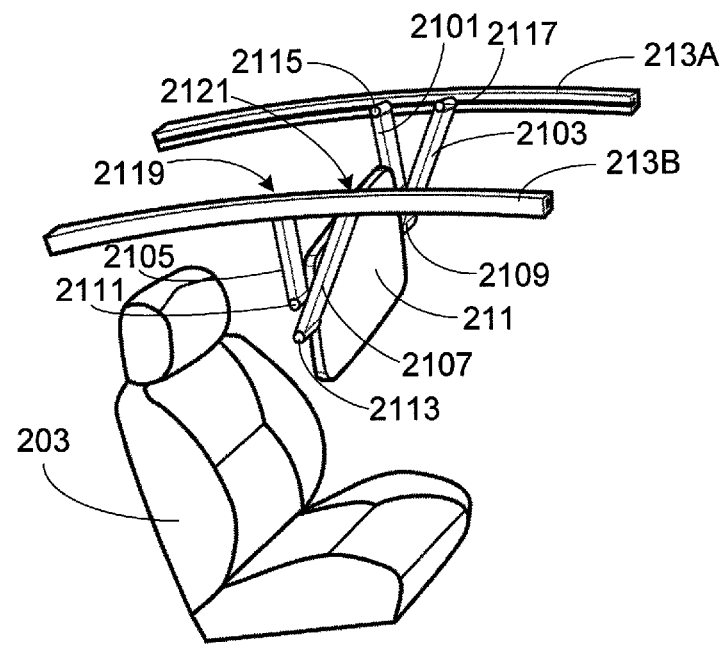
FIG. 21 provides a perspective view of a synchronized display attached to a pair of guide tracks via a first pair and a second pair of side mounted linkage arms.

In the embodiment shown in FIG. 21, display 211 is attached to a first guide track 213A via a first pair of side mounted arms 2101 and 2103, and to a second guide track 213B via a second pair of side mounted arms 2105 and 2107. Display 211 pivots relative to arm 2101 about a hinge not visible in this view; pivots relative to arm 2103 about hinge 2109; pivots relative to arm 2105 about hinge 2111; and pivots relative to arm 2107 about hinge 2113. Arm 2101 pivots relative to guide track 213A about hinge 2115; arm 2103 pivots relative to guide track 213A about hinge 2117; arm 2105 pivots relative to guide track 213B about a hinge (not visible in this view) at location 2119; and arm 2107 pivots relative to guide track 213B about a hinge (not visible in this view) at location 2121.

Figure 22:
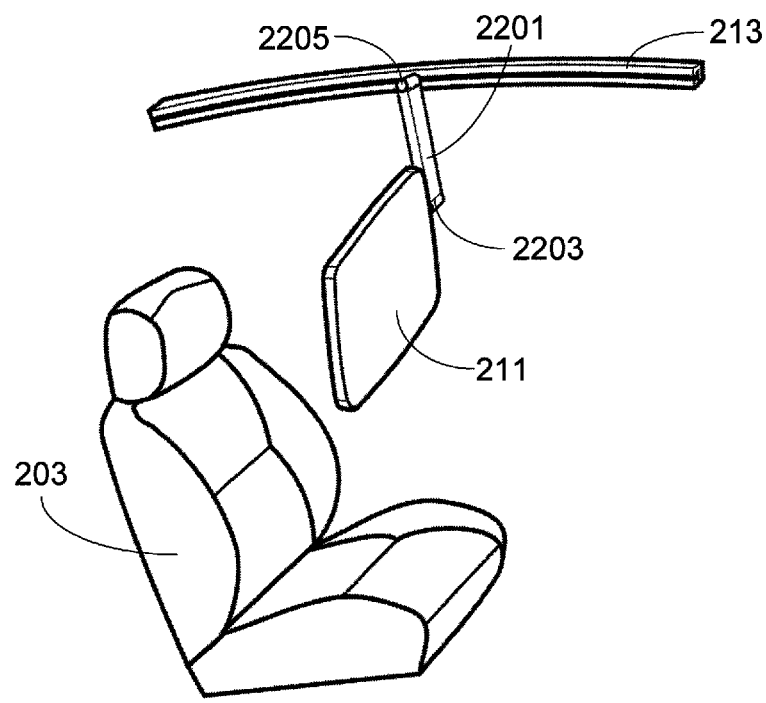
FIG. 22 provides a perspective view of a synchronized display attached to a single guide track via a single, side mounted linkage arm.

In the embodiment shown in FIG. 22, display 211 is attached to guide track 213 via a single, side mounted arm 2201. Display 211 pivots relative to arm 2201 about hinge 2203, while arm 2201 pivots relative to guide track 213 about hinge 2205.

Figure 23:
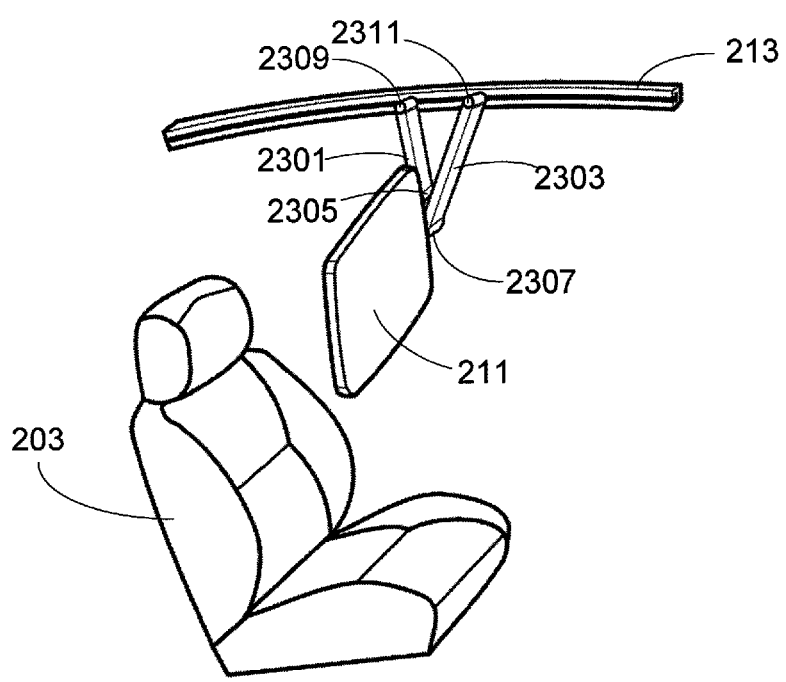
FIG. 23 provides a perspective view of a synchronized display attached to a single guide track via a pair of side mounted linkage arms.

In the embodiment shown in FIG. 23, display 211 is attached to guide track 213 via a pair of side mounted located arms 2301 and 2303. Display 211 pivots relative to arm 2301 about hinge 2305 (partially visible in this view) and relative to arm 2303 about hinge 2307 (partially visible in this view). Arm 2301 pivots relative to guide track 213 about hinge 2309 while arm 2303 pivots relative to guide track 213 about hinge 2311.

It should be understood that the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A display positioning system, comprising:
    a flat panel display screen mounted within and to a vehicle, wherein said flat panel display screen is mounted to a roof portion of said vehicle, wherein said flat panel display screen is adjustable within a range of display positions;
    a display positioning system coupled to said flat panel display screen;
    a vehicle seat adjustable within a range of seat positions, wherein said range of seat positions includes a first range corresponding to fore-aft seat positions, a second range corresponding to seat height positions, and a third range corresponding to seat recline positions;
    a vehicle seat position sensor, wherein said vehicle seat position sensor outputs seat position data corresponding to a current seat position, wherein said current seat position is within said range of seat positions;
    a memory, wherein stored within said memory is a look-up table providing a plurality of compatible display positions, wherein each of said plurality of compatible display positions correspond to a specific seat position within said range of seat positions, wherein said plurality of compatible display positions maintains a flat panel display screen viewing distance throughout said range of seat positions, wherein said plurality of compatible display positions maintains a flat panel display screen viewing height throughout said range of seat positions, and wherein said plurality of compatible display positions maintains a flat panel display screen viewing angle throughout said range of seat positions; and
    a control system coupled to said display positioning system and to said vehicle seat position sensor and to said memory, wherein said control system monitors said seat position data and utilizes said look-up table to select a current display position from said plurality of compatible display positions based on said current seat position, and wherein said control system automatically adjusts said flat panel display screen with said display positioning system to said current display position within said range of display positions in response to said current seat position.

2. The display positioning system of claim 1, further comprising a user interface coupled to said control system, wherein said control system is configured to accept a set of display settings input via said user interface, wherein said set of display settings include at least one of said flat panel display screen viewing distance, said flat panel display screen viewing height, and said flat panel display screen viewing angle, and wherein said control system adjusts said plurality of compatible display positions to maintain said set of display settings throughout said range of available seat positions.

3. The display positioning system of claim 1, said display positioning system further comprising an electro-mechanical positioning system.

4. The display positioning system of claim 1, said display positioning system further comprising a hydraulic positioning system.

5. The display positioning system of claim 1, further comprising a linkage assembly controllable by said display positioning system, wherein said flat panel display screen is mounted to said roof portion of said vehicle with said linkage assembly, and wherein said display positioning system and said control system utilizes said linkage assembly to adjust said flat panel display screen to said current display position.

6. The display positioning system of claim 5, said linkage assembly further comprising a track mounted to said roof portion of said vehicle, wherein a link of said linkage assembly slides within said track, wherein a position of said link within said track is controlled by said display positioning system, and wherein said display positioning system and said control system utilizes said link of said linkage assembly to adjust said flat panel display screen to said current display position.

7. The display positioning system of claim 5, said linkage assembly further comprising a telescoping link, wherein a link length corresponding to said telescoping link is controlled by said display positioning system, and wherein said display positioning system and said control system utilizes said telescoping link of said linkage assembly to adjust said flat panel display screen to said current display position.

8. The display positioning system of claim 5, said linkage assembly further comprising a first link and a second link, wherein a first end portion of said first link is pivotably coupled to said flat panel display screen, wherein a first end portion of said second link is pivotably coupled to a second end portion of said first link, and wherein a second end portion of said second link is pivotably coupled to said vehicle, and wherein said display positioning system and said control system utilizes said linkage assembly to adjust said flat panel display screen to said current display position.

9. The display positioning system of claim 8, said linkage assembly further comprising a track mounted to said roof portion of said vehicle, wherein said second end portion of said second link slides within said track, and wherein a position of said second end portion of said second link within said track is controlled by said display positioning system.

10. A method of positioning a flat panel display screen mounted to a roof portion of a vehicle, the method comprising the steps of:
determining a current seat position of a vehicle seat, wherein said current seat position is within a range of available seat positions, wherein said range of available seat positions includes a first range corresponding to fore-aft seat positions, a second range corresponding to seat height positions, and a third range corresponding to seat recline positions;
providing said current seat position of said vehicle seat to a control system;
selecting a display position from a plurality of compatible display positions based on said current seat position, wherein said plurality of compatible display positions are stored in a memory coupled to said control system and correspond to said range of available seat positions, wherein said plurality of compatible display positions is preset to maintain a flat panel display screen viewing distance regardless of said current seat position within said range of available seat positions, wherein said plurality of compatible display positions is preset to maintain a flat panel display screen viewing height regardless of said current seat position within said range of available seat positions, and wherein said plurality of compatible display positions is preset to maintain a flat panel display screen viewing angle regardless of said current seat position within said range of available seat positions, and wherein said step of selecting said display position is performed automatically by said control system; and moving said flat panel display screen to said display position selected by said control system, wherein said step of moving said flat panel display screen to said display position is performed automatically by a display positioning system controlled by said control system.

11. The method of claim 10, further comprising the steps of determining when a video source coupled to said flat panel display screen is activated and moving said flat panel display screen from a storage position to said display position when said video source is activated, wherein said step of moving said flat panel display screen from said storage position to said display position is performed automatically by said display positioning system controlled by said control system.

12. The method of claim 10, further comprising the steps of determining when a video source coupled to said flat panel display screen is deactivated and moving said flat panel display screen from said display position to a storage position when said video source is deactivated, wherein said step of moving said flat panel display screen from said display position to said storage position is performed automatically by said display positioning system controlled by said control system.

13. The method of claim 10, further comprising the steps of determining when said flat panel display screen is activated and moving said flat panel display screen from a storage position to said display position when said flat panel display screen is activated, wherein said step of moving said flat panel display screen from said storage position to said display position is performed automatically by said display positioning system controlled by said control system.

14. The method of claim 10, further comprising the steps of determining when said flat panel display screen is deactivated and moving said flat panel display screen from said display position to a storage position when said flat panel display screen is deactivated, wherein said step of moving said flat panel display screen from said display position to said storage position is performed automatically by said display positioning system controlled by said control system.

15. The method of claim 10, further comprising the steps of determining when said vehicle is turned off and moving said flat panel display screen from said display position to a storage position when said vehicle is turned off, wherein said step of moving said flat panel display screen from said display position to said storage position is performed automatically by said display positioning system controlled by said control system.

16. The method of claim 10, further comprising the steps of determining when a drive system of said vehicle is placed into park and moving said flat panel display screen from said display position to a storage position when said drive system of said vehicle is placed into park, wherein said step of moving said flat panel display screen from said display position to said storage position is performed automatically by said display positioning system controlled by said control system.

17. The method of claim 10, further comprising the steps of accepting a set of display settings for a particular seat position, wherein said set of display settings includes said display viewing distance, said display viewing height, and said display viewing angle, and wherein said set of display settings are input by a user, and wherein said control system adjusts said plurality of compatible display positions to maintain said set of display settings throughout said range of available seat positions.

18. The method of claim 10, wherein said display positioning system is comprised of a linkage assembly coupling said flat panel display screen to said roof portion of said vehicle, and wherein said step of moving said flat panel display screen to said display position further comprises the step of manipulating said linkage assembly.

\* \* \* \* \*